March 23, 1965 D. ORR 3,175,111
DYNAMOELECTRIC MACHINE WITH ODD MULTIPLE HARMONIC EXCITED FIELD
Filed July 27, 1962 3 Sheets-Sheet 2
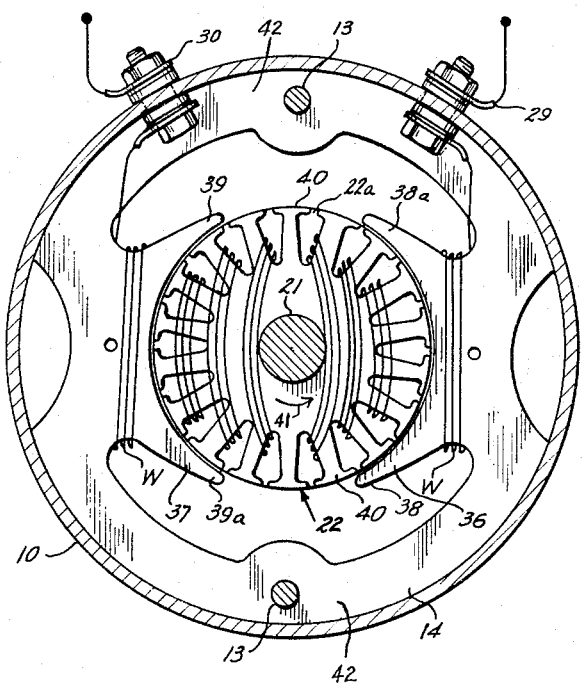
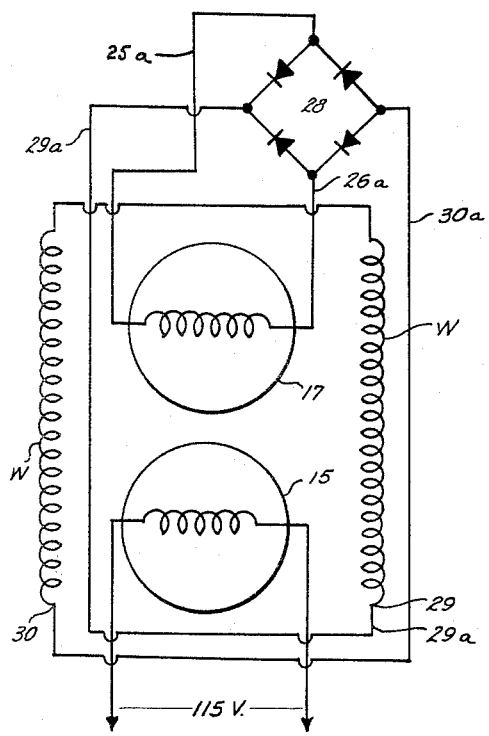
INVENTOR.
DONALD ORR
BY *Rudolph L. Lowell*
ATTORNEY.

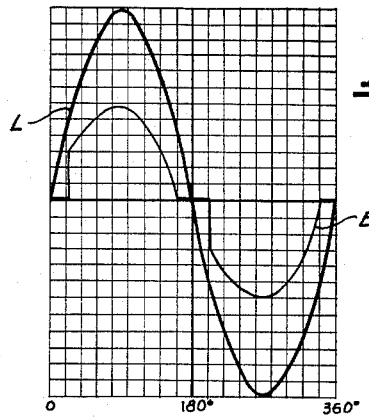
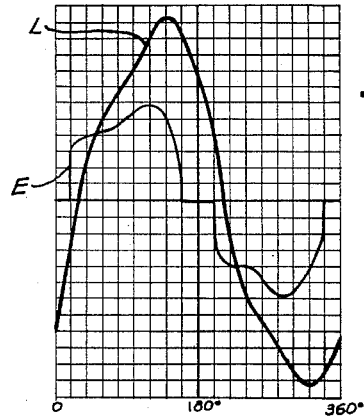
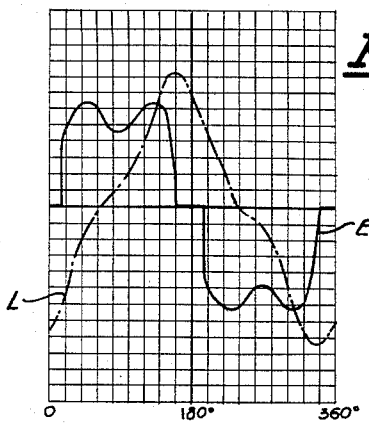
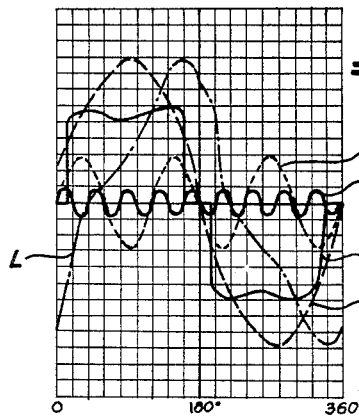
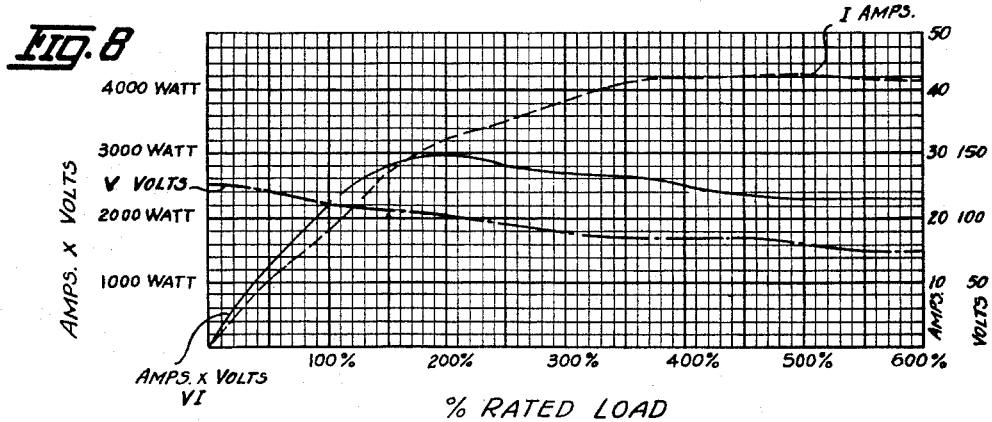
INVENTOR.
DONALD ORR

United States Patent Office 3,175,111
Patented Mar. 23, 1965

3,175,111
DYNAMOELECTRIC MACHINE WITH ODD
MULTIPLE HARMONIC EXCITED FIELD
Donald Orr, Arnolds Park, Iowa, assignor, by mesne
assignments, to Electrol Equipment Incorporated, Le
Hillier, Mankato, Minn., a corporation of Minnesota
Filed July 27, 1962, Ser. No. 212,956
2 Claims. (Cl. 310—126)

This invention relates generally to rotating dynamoelectric machines and more particularly to self-excited generators or to self-excited motors for starting or operating heavy loads, both electrical and mechanical.

The primary object of this invention is to provide a dynamoelectric machine which will effectively operate under heavy load conditions that would normally require a machine of larger size and a higher rated capacity.

Another object of this invention is to provide a generator which will effectively start heavy motors which would normally require a generator of larger size and a higher rated capacity.

A further object of this invention is to provide a self-excited generator, wherein the exciter portion is mounted within the same casing as the load portion, and constructed and assembled relative to the load portion to produce an inherent output voltage stability for various loads and extreme overload operation.

Another object of the invention is to provide a self-excited generator having excellent starting ability for low power-factor loads and inherent stability without the use of external regulators or external excitation, by the use of common field windings for the stators of the load and exciter portions.

Another object of this invention is to provide a generator having an exciter portion and a load portion with the rotors of such two portions being mechanically in line on the same shaft, and of the same core construction, except for the difference in axial lengths and skew inclination, and wherein the fields of the exciter and load portions are provided with common windings.

A still further object of this invention is to provide a self-excited dynamoelectric machine of single phase or poly-phase type in which exciter and load portions and their respective portions of field winding are relatively constructed and proportioned to produce a third harmonic and odd multiples thereof which produce for the load and exciter fields a flux wave form that approaches a square shape under extreme overload conditions.

With the foregoing and other objects in view, the invention resides in the following specification and appended claims, certain embodiments and details of construction of which are illustrated in the accompanying drawings in which:

FIG. 2 is a transverse sectional view taken along the lines 2—2 of FIG. 1;

FIG. 3 is a winding diagram for the machine of FIG. 1;

FIGS. 4 through 7 illustrate graphically various phases of operation of the generator under various load conditions; and FIG. 8 is a composite graph showing the performance curves of a machine of this invention when operating as a generator.

Figure 1:
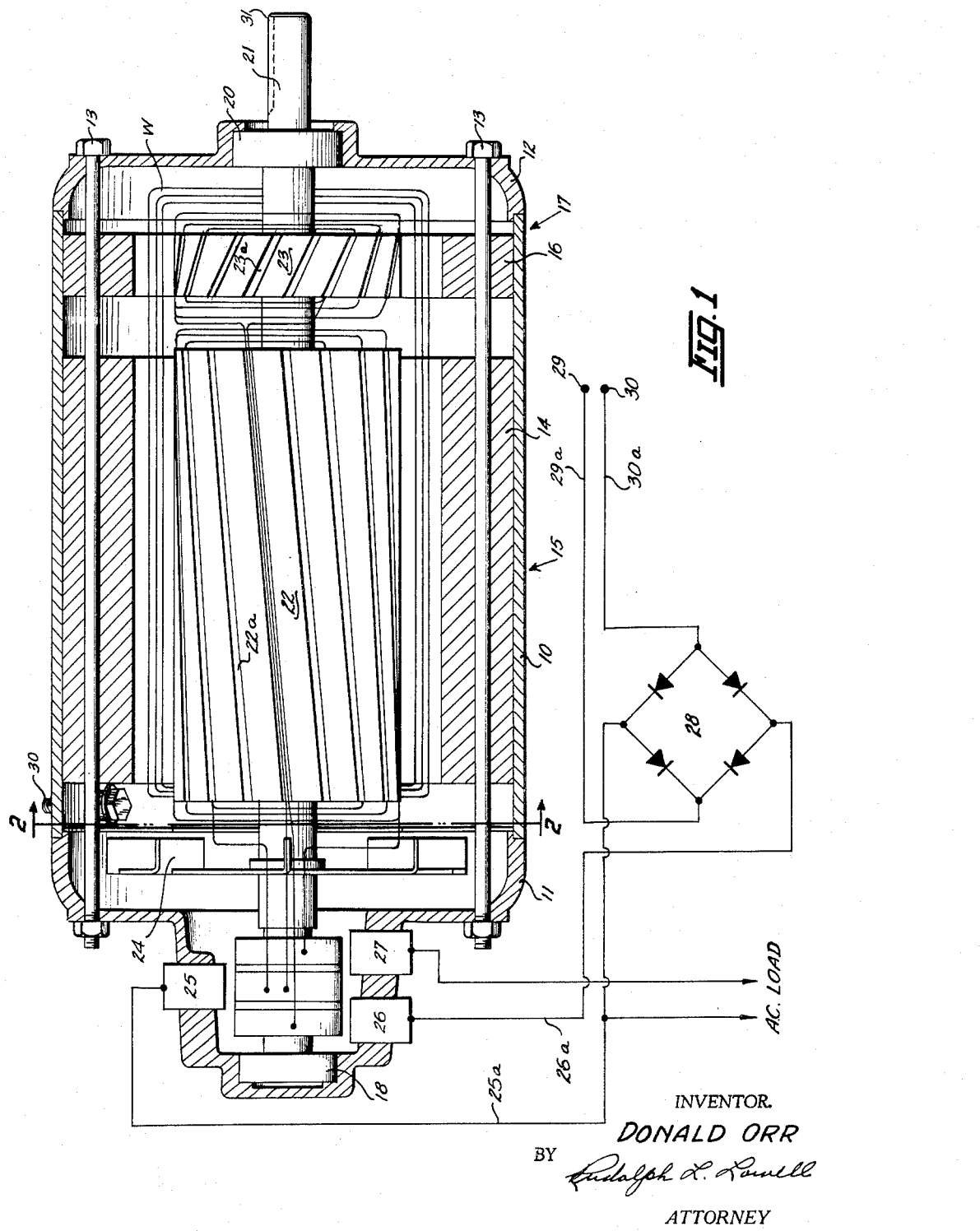
FIG. 1 is a longitudinal sectional view of a dynamoelectric machine of this invention.

Referring more particularly to FIGS. 1 and 2, a self-excited generator of this invention with two poles for 60 cycle 3600 r.p.m. operation is illustrated as having a frame or casing 10 with end bell sections 11 and 12 interconnected to the casing 10 and to each other by suitable bolt assemblies 13. Concentric with and mounted against the inner wall of the casing 10 is a stack of electrical steel laminations 14 comprising the stator for the load portion 15 of the combination unit described as a generator herewith. Also mounted on the inner wall of the casing 10 is a second set of laminations 16 comprising the stator for the exciter portion 17 of the combination unit. The laminations 14 and 16 are identical in size, shape and construction.

Suitably mounted on bearings 18 and 20 in the end bell sections 11 and 12, respectively, is a common shaft 21 on which are mounted a load armature 22 and a spaced exciter armature 23. These armatures have like core laminations and are mechanically aligned with the stator sections 14 and 16 of the load and exciter portions 15 and 17, respectively, of the generator, but as best appears in FIG. 1 the slots 22a and 23a of the armatures 22 and 23 also respectively, are reversely skewed relative to the axis of the shaft 21. Mounted on the shaft 21 is a fan 24 for creating a circulation of air internally of the casing 10 for cooling purposes.

As illustrated in FIG. 1, the load and exciter portions 15 and 17 of the generator are connected with each other as illustrated in the winding diagram of FIG. 3. This interconnection is made partially through the common field winding W of the two portions and partially through a rectifier 28 interposed between the rotor 23 of the exciter portion 17 and the field winding connection of the load portion 15. The load and exciter portions may have their field windings connected in series but a common field is preferred because its total impedance will include less resistance. Also the common field winding W permits the use of the same size wire in the field winding of both the exciter and load portions of the generator. Since the common field winding W has only two ends in the generator assembly, the ampere-turns in the field windings of the exciter and load portions are directly proportional to the axial lengths of the exciter and load armatures. With the laminations 14 and 16 of the stator sections being identical, the number of phases in the windings of the fields of the exciter and load portions is the same.

Referring to FIGS. 1 and 2, it will be noted that the generator or dynamoelectric machine is provided with a brush rigging shown diagrammatically at 25, 26 and 27, whereby the output from the entire machine to the A.C. load is taken off the brush rigging portions 25 and 27 as indicated. The output from the armature or rotor 23 of the exciter 17 is all supplied to the load portion 15 and is taken off of the brush elements 25 and 26 and fed by leads 25a and 26a to a full-wave rectifier bridge 28 from whence the rectified current is fed by suitable leads 29a and 30a to the common field-winding terminals 29 and 30 illustrated in FIG. 2. The actual winding and its connections to either side of the rectifier bridge is readily apparent from FIG. 3.

The shaft 21 is provided with an undercut or keying section 31 for connection to a suitable drive means (or a driven means for motors, not shown). When the generator is started by the drive means under various conditions from no load to heavy overloads, the performance may be best illustrated and described with reference to the descriptive graphs illustrated in FIGS. 5 through 8. These graphs are essentially reproductions of oscilloscope test photographs or displays under various operating conditions.

FIG. 4 illustrates the wave form of the load and exciter output voltages when the generator is operating at no load; the wave form of the exciter output voltage being indicated at E and the wave form of the load output voltage being indicated at L. It is seen that both wave forms follow generally a sine curve. Under this no load condition the third harmonics of the exciter and load output voltages are very small. It is seen that the exciter wave form has approximately a 42° prefire angle (time during which current is limited) caused by the high reactance of the exciter armature.

In a full load condition as shown in FIG. 5 the wave form L of the load output voltage includes a third harmonic and odd multiples thereof at approximately 90°. Their harmonics in the load output voltage of course depend on the nature of the electrical load connected to the generator with the generator loads used for the illustrations in FIGS. 4–7, being pure resistance load.

The wave form E of the exciter output voltage in FIG. 5 includes a third harmonic and odd multiples thereof at approximately 90° and shows a prefire angle smaller than that shown in FIG. 4, which indicates a lesser reactance in the exciter armature with an increase in generator load. These included harmonics in the exciter output voltage become larger in proportion to the generator load and are not affected by the nature of the generator load, i.e., the resistance, inductance or capacitance of the generator load. The smaller prefire angle indicates less reactance in the exciter armature because the wave form has a broader top than the wave form E of FIG. 4.

The extreme overload condition shown in FIG. 6 has a load output voltage wave from L with a large third harmonic and odd multiples thereof approaching 180°.

The wave form E of the exciter output voltage in FIG. 6 includes a third harmonic and odd multiples thereof at near 0°. The prefire angle is smaller than in FIG. 5 indicating a lesser armature reactance, with an increase in generator load.

In one embodiment of a generator built in accordance with this invention it was found that when the exciter armature reactance resulted in a prefire angle of less than 45° and more than 35° the odd multiples of the third harmonic were close to 0° phase angle so that the third harmonic resulted in producing a more efficient exciter output voltage wave form and a stronger field current in the common field winding. When the prefire angle was more than 45° or less than 35° the odd multiples of the third harmonic were at a phase angle to the third harmonic that resulted in an inefficient exciter output voltage wave form and a weak field current in the common field winding. A prefire angle of approximately 42° in this embodiment provided a third harmonic and odd multiples thereof at 0° and an exciter armature reactance value which resulted in effecting a large measure of field current control with change in exciter armature reactance.

Another factor that can be adjusted to control the phase angle of the third harmonic and the odd multiples thereof is the exciter field strength which, with a common winding, can be lowered by placing part of the field winding turns so that they excite only the load portion of the field structures.

In FIG. 7 there is indicated a graph similar to FIG. 6, but showing the wave forms of a third harmonic and a strong ninth harmonic for the exciter output voltage in conjunction with the wave form L of the load voltage, and the wave form E of the exciter output voltage. Similarly to FIG. 6, the third and ninth harmonics for the exciter output voltage approach 0°, and the wave forms for these harmonics are indicated at H3 and H9, respectively, and are seen to be sine curves.

The wave form of the fundamental frequency, designated as F, is also seen to be a sine curve. The wave form L of the load voltage, similar to FIG. 6, has pronounced peaks and the third harmonic and the odd multiples thereof approach 180°. The resultant wave form E of the exciter output voltage, similarly to FIG. 6, is of a substantially square shape.

It is this square wave form E of the exciter output voltage, which provides for the stable operation and power maintenance of the generator under heavy starting loads and extreme overloads, and as seen from the reproduced oscilloscope displays of FIGS. 4 through 7. This optimum wave form is substantially approached by the dynamoelectric machine of this invention in the control of the third harmonic and the odd multiples thereof, in the exciter output voltage. By varying the inclination of the slots 23a in the armature 23 of the exciter portion 17, the third harmonic and the odd multiples thereof can be varied to produce harmonics of varying magnitudes.

FIG. 8 is a composite graph of test readings under various load conditions applied to a generator of this invention normally rated at 2000 watts at 115 volts and 60 cycles, with the curve V showing the load voltage of the generator, the curve I the load current of the generator, and the curve VI, the volt-amperes delivered by the generator from no load to extreme overload conditions up to 600% of full load. It is seen that a current increase relative to a voltage drop is maintained such that at the extreme overload of 600%, the load capacity of the generator is maintained.

These results are accomplished by the control of the third harmonic and its odd multiples to produce the wave form E approaching a square shape as shown in FIGS. 6 and 7. The harmonics increase with an increase in the load applied to the load portion 15 of the generator. With the use of a common field winding W for the exciter portion 17 and load portion 15, or fields for these portions connected in series, the third harmonic and the odd multiples thereof will increase in the exciter output voltage with the increase of the load applied to the armature 22 of the load portion 15. Since the third harmonic and the odd multiples thereof for the exciter output voltage are in a 0° phase angle with the exciter output voltage wave form, this form approaches a substantially square shape. When this square-shape form is approached, the reactance in the common field winding W is reduced relative to its reactance when the wave form of the exciter output voltage has a single peak, whereby more current is permitted to flow in the common field winding W with like increase of field flux and additional generator load voltage. Thus, by virtue of this current increase, the field strength of the exciter is increased so as to resist a drop in the voltage output of the generator. It is thus seen that the build-up of the exciter field current amplifies the build-up of voltage output from the armature 22 of the load portion 15 of the generator.

As a result, therefore, of the series or common field winding W for the generator exciter portion 17 and load portion 15, when an overload occurs the third harmonic and odd multiples thereof, of the output voltage of the load portion 15 moves from 90° and approaches 180°, while the third harmonic and odd multiples thereof for the output voltage of the exciter portion 17 moves from 90° and approaches 0°. At full load these harmonics of the exciter and load output voltage move toward 90°. This movement of the third harmonic takes place by virtue of the difference effected, by an increase in load, in the inductance of the field windings of the exciter and load portions.

Referring to FIG. 1 it is seen that the diameters of the armatures 22 and 23 for the load and exciter portions 15 and 17, respectively, are of the same diameter but of different axial lengths. As illustrated the axial length of the load armature 22 is at least five times greater than the axial length of the exciter armature 23.

It has been previously noted that the electrical steel laminations 14 and 16 for the generator portions 15 and 17, respectively, are of an identical construction. With the use of a like number of wire turns in the winding W, therefore, it is seen that the ampere-turns in the field windings associated with the load and exciter portions of the generator is directly in proportion to the respective axial lengths of the armatures 22 and 23, so that the field winding in the load portion 15 has at least five times the number of ampere-turns as the field winding in the exciter portion 17.

There is thus effected in the exciter armature 23 a high reactance relative to the low number of ampere-turns in the field winding for the exciter portion 17. Conversely, there is effected in the load armature 22 a low reactance relative to the high number of ampere-turns in the field winding for the load portion 15. This high reactance to ampere-turns in the exciter portion 17 of the generator provides for a control of the third harmonic and the odd multiples thereof, in the exciter field to produce the desired square wave forms E, for the exciter output voltage, shown in FIGS. 6 and 7. Additionally the high field strength and low reactance of the load armature 22, provides for the shifting of the third harmonic in the load output voltage from 90° to 180°, and the low field strength and high reactance of the exciter armature 23, provides for the shifting of the third harmonic in the exciter output voltage from 90° toward 0°.

As shown in FIG. 2, for the load laminations 14, the pole faces 36 and 37 have a combined arc length which covers at least seventy percent of the peripheral length of the load armature 22, and with the faces 36 and 37 terminating in feathered tips 38, 38a and 39, 39a, respectively. This construction of the pole faces 36 and 37 provides for a greater load capacity, since the attenuated tips increase flux leakage up to a certain value. This increased length of the pole faces 36 and 37, is especially beneficial for overload operation of the generator, since the flux is distributed through more teeth 40 on the load armature 22 to give greater load capacity.

During overload operation, assume the armature 22 as being rotated in a counterclockwise direction, indicated by the arrow 41 in FIG. 2. The flux flow will move between the poles 36 and 37 from the trailing tip 38a of pole face 36 to the trailing tip 39a of pole face 37 so that the leading tips 38 and 39 of the pole faces 36 and 37, respectively, will be without any flux concentration. The flux path is completed by flow from the trailing tip 39a through the connecting sections 42 of the laminations 14 to the trailing tip 38a. These connecting sections 42 are of a width and thickness to carry all of the flux during overload without becoming magnetically saturated.

In this separately excited A.C. generator with a common field winding W for the two portions of the machine, it is seen that the common winding, as compared to separate windings connected in series, provides a lower resistance path per ampere turn. The total impedance (inductive reactance and resistance) of the common or series winding contains a larger percentage of inductance and therefore is more sensitive to inductive changes with load armature phase lag. This inductive change lowers the impedance of the field as the load increases and allows more current to get to the field of the load generator which produces more voltage, thereby compensating for load increase, particularly at starting and at extreme overloads.

It is well known in the art that A.C. motors require for starting, from four to seven times the full load running current if line voltage is maintained. Therefore, it is seen that the exciter portion, with the third harmonic in opposition, is benefited since the square wave shape of the exciter output voltage gives a faster rise of the current to the field of the load portion, so as to build up the field strength which in turn is amplified by the armature 22 of the load portion 15.

With further reference to FIG. 3, the rectifier bridge 28 converts the A.C. output of the exciter armature to a pulsating direct current for exciting the field coils connected through the terminals 29 and 30, as illustrated. Although it is not considered desirable in this machine, the rectifiers could be of the rotating type and mounted internally on the rotor portion of this machine.

The common field coils or winding W may be connected in series and may be wound either with a large number of turns for excitation and low current values and reasonably high voltage, or with a small number of turns acquiring high current excitation at low voltage, the number of turns per pole on the exciter armature being properly chosen to give the desired current and voltage relationships. At the beginning of each half cycle, the current from the exciter armature through the rectifier to the field is limited for a period of time due to the reactance between the armature and the field. The time during which the current is limited is inversely proportional to the amount of iron in the exciter armature. The increase in exciter voltage, with increase in load, is partially due to this shortened limiting time and partially to wave form change. The phase shift of the oscillation between the two fields is caused by the shifting of the magnetic flux toward the trailing field pole tips. In a conventional A.C. generator excited with either direct current or rectified A.C. current, the excitation watt output drops when overloaded because an efficient wave form of the exciter cannot be attained.

When the two armatures are lined up on the shaft, mechanically in phase, the generator will operate the same in both directions, but the exciter portion will lag behind the load portion due to the shifting of the flux from the exciter field away from the leading pole tips and toward the trailing pole tips. If the exciter armature 23 is slightly advanced in the direction of rotation to the amount of the exciter lag, the generator will have more stability since the two armatures will start in phase at no load and the phase shift of the load will be away from the exciter as load is applied.

The dynamoelectric machine of this invention is constructed with a high exciter armature reactance and a relatively balanced exciter field strength so as to result in a third harmonic and the odd multiples thereof being at 0° at extreme overload and with the exciter armature reactance and the total field (load plus exciter) reactance being at values which produce the greatest amount of current control in the exciter field winding.

The proportion of axial lengths of the load and exciter armatures, previously described in connection with FIG. 1, is only exemplary of one way of maintaining a proper relation between the reactance of the exciter armature and the exciter field strength. It is also to be understood that the dynamoelectric machine of this invention is not limited as to speed, frequency, phase or number of poles in order to obtain the desired machine characteristic of an exciter output voltage wave form of a substantially square shape at extreme overloads.

Although the dynamoelectric machine of this invention has been described with respect to a preferred embodiment thereof, i.e., a generator, it is to be understood that it is not to be so limited, since changes can be made therein which are within the full intended scope of this invention as defined by the appended claims.

I claim:
1. A dynamoelectric machine comprising:
   (a) an exciter portion with a field structure and an armature, said armature having a high armature reactance relative to a low ampere turn field strength,
   (b) a load portion with a field structure and an armature, said load armature having a low armature reactance relative to a high ampere turn field strength, whereby the difference in inductances of the exciter field structure and the load field structure gives admittance to the third and ninth harmonics and odd multiples thereof,
   (c) a common armature shaft for said portions,
   (d) a common field winding for said field structures,
   (e) a rectifier means,
   (f) means for interconnecting the alternating current output of the exciter armature through the rectifier means to said common field winding for supplying a rectified direct current thereto, and
   (g) means for connecting an alternating current output from said load portion to an external alternating current system.

2. The invention according to claim 1 wherein the voltage output of the exciter portion has a third harmonic and a ninth harmonic whereby said third and ninth harmonics are enlarged at 0° phase angle to the fundamental frequency at extreme overloads to change the wave form of the exciter output voltage to one approaching a square wave at extreme overloads of the machine.

References Cited by the Examiner

UNITED STATES PATENTS

| | | | |
|---|---|---|---|
| 2,970,249 | 1/61 | Mazur | 310—112 |
| 3,034,035 | 5/62 | Baumann | 322—90 |
| 3,098,191 | 7/63 | Cavert | 322—90 |

FOREIGN PATENTS

| | | |
|---|---|---|
| 553,398 | 3/23 | France. |
| 314,918 | 10/19 | Germany. |
| 596,395 | 4/34 | Germany. |
| 678,248 | 7/39 | Germany. |

MILTON O. HIRSHFIELD, *Primary Examiner.*